United States Patent
Ugajin

(10) Patent No.: US 10,126,026 B2
(45) Date of Patent: Nov. 13, 2018

(54) REFRIGERATION CYCLE APPARATUS

(71) Applicant: Mitsubishi Electric Corporation, Tokyo (JP)

(72) Inventor: Yuki Ugajin, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 45 days.

(21) Appl. No.: 15/505,637

(22) PCT Filed: Oct. 16, 2014

(86) PCT No.: PCT/JP2014/077520
§ 371 (c)(1),
(2) Date: Feb. 22, 2017

(87) PCT Pub. No.: WO2016/059696
PCT Pub. Date: Apr. 21, 2016

(65) Prior Publication Data
US 2017/0284712 A1    Oct. 5, 2017

(51) Int. Cl.
F25B 49/02 (2006.01)
F25B 29/00 (2006.01)
F25B 40/04 (2006.01)
F25D 17/04 (2006.01)
(Continued)

(52) U.S. Cl.
CPC ............ F25B 29/003 (2013.01); C09K 5/045 (2013.01); F25B 9/006 (2013.01); F25B 40/04 (2013.01);
(Continued)

(58) Field of Classification Search
CPC .... F25B 13/00; F25B 29/003; F25B 2400/23; C09K 5/041
See application file for complete search history.

(56) References Cited

U.S. PATENT DOCUMENTS 5,768,902 A * 6/1998 Nonaka ................. F25B 9/006
                                                            62/183
6,405,559 B1 * 6/2002 Yoneda .................. F25B 40/02
                                                            62/513
(Continued)

FOREIGN PATENT DOCUMENTS

JP      H11-094389 A      4/1999
JP      2001-304783 A    10/2001
(Continued)

OTHER PUBLICATIONS

International Search Report of the International Searching Authority dated Jan. 20, 2015 for the corresponding international application No. PCT/JP2014/077520 (and English translation).
(Continued)

*Primary Examiner* — Marc E Norman
(74) *Attorney, Agent, or Firm* — Posz Law Group, PLC

(57) ABSTRACT

A refrigeration cycle apparatus according to the present invention includes a refrigerant circuit formed by connecting, by pipes, a compressor configured to compress a refrigerant sucked into the compressor and discharge the refrigerant, a condenser configured to cause the refrigerant to reject heat and condense the refrigerant, an electronic expansion valve configured to reduce a pressure of the condensed refrigerant, and an evaporator configured to cause the refrigerant to remove heat and evaporate the refrigerant, in which the refrigerant is a refrigerant mixture including R32 and HFO-1123, and in the refrigerant mixture, R32 is greater than HFO-1123 in mass %.

17 Claims, 10 Drawing Sheets

(51) Int. Cl.
  *C09K 5/04* (2006.01)
  *F25B 9/00* (2006.01)
  *F24F 5/00* (2006.01)
  *F25B 13/00* (2006.01)
  *F25B 40/00* (2006.01)

(52) U.S. Cl.
  CPC ............ *F25B 49/027* (2013.01); *F25D 17/04* (2013.01); *C09K 2205/126* (2013.01); *C09K 2205/22* (2013.01); *F24F 5/00* (2013.01); *F25B 13/00* (2013.01); *F25B 40/00* (2013.01); *F25B 2400/0403* (2013.01)

(56) References Cited

U.S. PATENT DOCUMENTS

| | | |
|---|---|---|
| 2011/0005270 A1 | 1/2011 | Yoshimi et al. |
| 2015/0337191 A1 | 11/2015 | Fukushima |
| 2017/0016660 A1* | 1/2017 | Nishiyama .............. F25B 9/006 |
| 2017/0097002 A1* | 4/2017 | Ishizono ............... F04C 29/124 |

FOREIGN PATENT DOCUMENTS

| | | |
|---|---|---|
| JP | 2002-061992 A | 2/2002 |
| JP | 2007-085730 A | 4/2007 |
| JP | 2008-096095 A | 4/2008 |
| JP | 2009-229051 A | 10/2009 |
| JP | 2011-127831 A | 6/2011 |
| JP | 2013-257072 A | 12/2013 |
| JP | 2014-098166 A | 5/2014 |
| WO | 2014/123120 A1 | 8/2014 |

OTHER PUBLICATIONS

Office Action dated Aug. 1, 2017 issued in corresponding JP patent application No. 2016-553922 (and English translation).

* cited by examiner

REFRIGERATION CYCLE APPARATUS

CROSS REFERENCE TO RELATED APPLICATION

This application is a U.S. national stage application of International Application No. PCT/JP2014/077520, filed on Oct. 16, 2014, the contents of which are incorporated herein by reference.

TECHNICAL FIELD

The present invention relates to a refrigeration cycle apparatus including a refrigerant circuit.

BACKGROUND

Hitherto, there has been a refrigeration cycle apparatus configured to execute a refrigeration cycle through use of an "HFC refrigerant", e.g., R410A that is non-combustible. R410A has an ozone depletion potential (hereinafter referred to as "ODP") of zero and does not deplete the ozone layer unlike an "HCFC refrigerant", e.g., R22. However, R410A has a property in which a global warming potential (hereinafter referred to as "GWP") is high. Therefore, as one effort to prevent global warming, it is currently being considered to change the refrigerant that is used from an HFC refrigerant having a high GWP, e.g., R410A, to a refrigerant having a low GWP (hereinafter referred to as "low-GWP refrigerant").

As a candidate for the low-GWP refrigerant, there has been an HFC refrigerant that does not have a carbon-carbon double bond in its composition. Examples of the HFC refrigerant include R32 ($CH_2F_2$; difluoromethane) having a GWP lower than that of R410A. Further, as a similar candidate refrigerant, there has been a halogenated hydrocarbon, which is one type of HFC refrigerant similar to R32 and has a carbon-carbon double bond in its composition. As such halogenated hydrocarbons, there have been known, for example, HFO-1234yf ($CF_3CF=CH_2$; tetrafluoropropene) and HFO-1234ze ($CF_3$—CH=CHF). Here, in order to distinguish an HFC refrigerant having a carbon-carbon double bond in its composition from an HFC refrigerant that does not have a carbon-carbon double bond in its composition like R32, the HFC refrigerant having a carbon-carbon double bond in its composition is expressed as an "HFO refrigerant" in many cases through use of "O" standing for olefin (unsaturated hydrocarbon having a carbon-carbon double bond is called olefin).

Further, as a similar candidate refrigerant, similarly to HFO-1234yf, HFO-1234ze, and other refrigerants, there has been known HFO-1123 ($CH_2=CHF$; 1,1,2-trifluoroethene (ethylene)) that is one kind of HFO refrigerant.

However, there is a possibility that HFO-1123, which is the low-GWP refrigerant, may cause self-decomposition. Therefore, in order to suppress the self-decomposition, an HFC refrigerant is mixed with HFO-1123 for use in some cases (see, for example, Patent Literature 1). According to Patent Literature 1, when HFO-1123 and an other refrigerant are mixed, a content ratio of HFO-1123 in a working fluid (100 mass %) is preferably 60% or greater, more preferably 70% or greater, further preferably 80%, and particularly preferably 100%.

PATENT LITERATURE

Patent Literature 1: Japanese Unexamined Patent Application Publication No. 2014-098166

In the technology disclosed in Patent Literature 1, however, the content ratio of HFO-1123 is set to 60% or greater. Therefore, when the technology described in Patent Literature 1 is used for an air-conditioning apparatus, a risk of the self-decomposition of HFO-1123 cannot be completely eliminated under high temperature and high pressure. Thus, there is a possibility that problems in terms of performance and quality may remain.

SUMMARY

The present invention has been made to solve the problem described above, and has an object to provide a refrigeration cycle apparatus that prevents a change in refrigerant composition in a refrigerant circuit even when a refrigerant having a property to cause self-decomposition is employed.

A refrigeration cycle apparatus according to one embodiment of the present invention includes a refrigerant circuit formed by connecting, by pipes, a compressor configured to compress a refrigerant sucked into the compressor and discharge the refrigerant, a condenser configured to allow the refrigerant to reject heat and condense the refrigerant, a pressure reducing device configured to reduce a pressure of the condensed refrigerant, and an evaporator configured to allow the refrigerant to remove heat and evaporate the refrigerant, in which the refrigerant is a refrigerant mixture including R32 and HFO-1123, and in the refrigerant mixture, R32 is greater than HFO-1123 in mass %.

According to the refrigeration cycle apparatus of one embodiment of the present invention, by setting R32 greater than HFO-1123 as a ratio between R32 and HFO-1123 in mass %, the self-decomposition of HFO-1123 is prevented so as to ensure sufficient performance and quality without changing the refrigerant composition in the refrigerant circuit.

DETAILED DESCRIPTION

Figure 1:
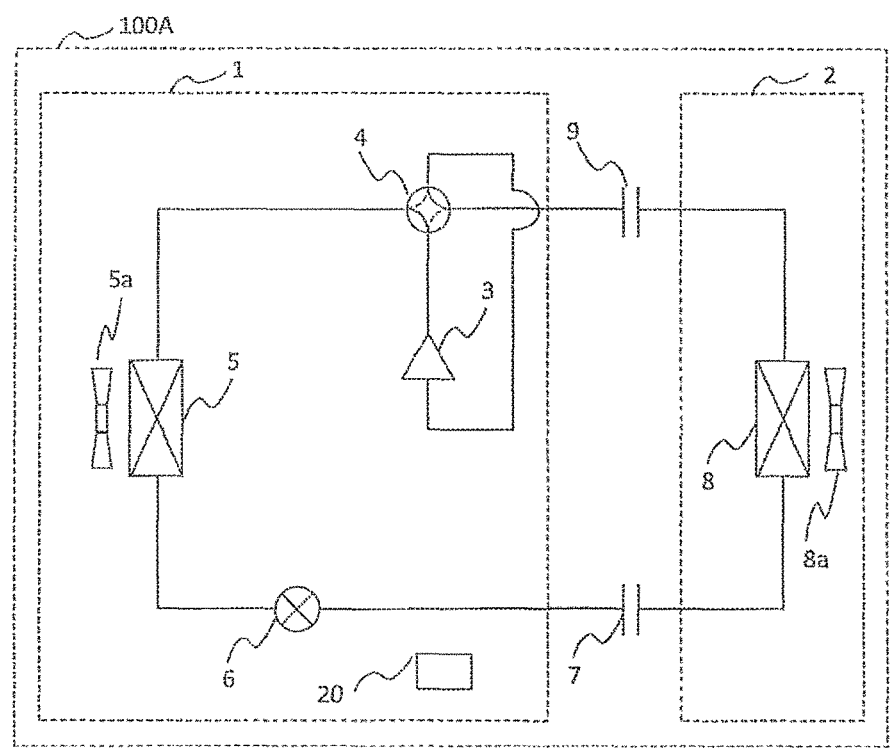
FIG. 1 is a schematic configuration diagram for illustrating an example of a refrigerant circuit configuration of a refrigeration cycle apparatus according to Embodiment 1 of the present invention.

Now, an air-conditioning apparatus according to embodiments of the present invention is described with reference to the drawings. In the drawings referred to below, components denoted by the same reference symbols correspond to the same or equivalent components. This is common throughout the embodiments described below. Further, the forms of the components described herein are merely examples, and the components are not limited to the forms described herein. In particular, the combinations of the components are not limited to only the combinations in each embodiment, and the components described in another embodiment may be applied to still another embodiment. Further, in the drawings, the size relationship between the components may be different from the actual size relationship. In addition, a high-and-low relationship or other relationships of temperature, pressure, or other factors are not determined in relation to particular absolute values, but are determined in a relative manner based on a state, operation, or other factors of systems, devices, or other conditions.

Embodiment 1

FIG. 1 is a schematic configuration diagram for illustrating an example of a refrigerant circuit configuration of a refrigeration cycle apparatus (hereinafter referred to as "refrigeration cycle apparatus 100A") according to Embodiment 1 of the present invention. The refrigeration cycle apparatus 100A is described with reference to FIG. 1.

The refrigeration cycle apparatus 100A includes an outdoor unit 1 and an indoor unit 2. The outdoor unit 1 and the indoor unit 2 are connected to each other by a liquid pipe 7 and a gas pipe 9 so that refrigerant forms a refrigerant circuit. As a main component of the refrigerant flowing through the refrigerant circuit in the refrigeration cycle apparatus 100A, a refrigerant having a property to cause self-decomposition is assumed to be employed. In FIG. 1, the one outdoor unit 1 and the one indoor unit 2 are connected to each other by the pipes to form the refrigerant circuit. However, the number of the outdoor units 1 and the number of the indoor units 2 are not limited to one, and two or more outdoor units 1 and/or indoor units 2 may be connected.

The outdoor unit (heat source apparatus) 1 of this embodiment is configured to convey heat (heating energy or cooling energy) to the indoor unit 2. The outdoor unit 1 includes a compressor 3, a four-way valve 4, an outdoor heat exchanger (first heat exchanger) 5, an outdoor air-sending device 5a, and an electronic expansion valve 6. Further, the indoor unit (use-side device) 2 is configured to, for example, supply heat to a target of supply so as to heat or cool the target of supply. The indoor unit 2 includes an indoor heat exchanger (second heat exchanger) 8 and an indoor air-sending device 8a.

The compressor 3 is configured to compress the refrigerant, to thereby discharge the refrigerant. As the compressor 3, for example, it is preferred to use a positive-displacement compressor, which is a type of compressor having a rotation speed and an operation capacity controlled by an inverter circuit. Examples of the positive-displacement compressor include a rotary compressor, a scroll compressor, a screw compressor, and a reciprocating compressor. Further, the compressor 3 includes an electric motor.

The four-way valve 4 that is a refrigerant circuit switching device is configured to switch a passage of the refrigerant in accordance with a selected mode, that is, a cooling energy supply mode (e.g., a cooling operation mode) or a heating energy supply mode (e.g., a heating operation mode). In this case, the four-way valve 4 is described as an example of the refrigerant circuit switching device. However, the refrigerant circuit switching device is not limited to the four-way valve 4 as long as the passage of the refrigerant can be selectively switched. For example, two two-way valves or three-way valves can be combined to form the refrigerant circuit switching device. Further, although the refrigeration cycle apparatus 100A of this embodiment includes the refrigerant circuit switching device, the refrigeration cycle apparatus may be formed without the refrigerant circuit switching device when the passage of the refrigerant is not required to be switched.

The outdoor heat exchanger 5 that is the first heat exchanger functions as a condenser or an evaporator. The outdoor heat exchanger 5 can be constructed with, for example, a cross fin-type fin-and-tube heat exchanger including heat transfer tubes and a large number of fins. In the following, the outdoor heat exchanger 5 is described as an exchanger configured to exchange heat between the refrigerant passing through the heat transfer tubes and air. However, the outdoor heat exchanger 5 may be a heat exchanger configured to exchange heat between the refrigerant and a heat medium other than air (e.g., water or brine). Further, the outdoor heat exchanger 5 may not be a fin-and-tube heat exchanger depending on the heat medium with which the heat is exchanged. For example, a microchannel heat exchanger, a shell and tube heat exchanger, a heat pipe heat exchanger, a double pipe heat exchanger, a plate heat exchanger, or other heat exchangers may be employed. Further, although a case where the first heat exchanger is the outdoor heat exchanger 5 installed outdoors is described as an example, a location of installation of the first heat exchanger is not limited to outdoors. The first heat exchanger only needs to be a heat exchanger provided on a heat source side.

The outdoor air-sending device 5a is configured to supply the air to the outdoor heat exchanger 5. The outdoor air-sending device 5a is capable of changing a flow rate of the air supplied to the outdoor heat exchanger 5. For example, as the outdoor air-sending device 5a, a centrifugal fan or a multiblade fan to be driven by a motor, e.g., a DC fan motor, can be employed. In this case, when the outdoor heat exchanger 5 exchanges the heat between the refrigerant and the heat medium other than the air, the heat medium may be supplied to the outdoor heat exchanger 5 by a delivering device, e.g., a pump in place of the outdoor air-sending device 5a.

The electronic expansion valve 6, which is a flow control device, is a device configured to control its expansion opening degree based on an instruction from a controller 20 to control the flow rate of the refrigerant, reduce the pressure of the refrigerant, and perform other operations. In this case, the electronic expansion valve 6 having the structure capable of controlling the expansion opening degree is described as an example. However, the flow control device is not limited thereto. For example, a mechanical expansion valve using a diaphragm for a pressure-receiving portion, a capillary tube, or other devices may be employed as the flow control device.

The indoor heat exchanger 8 functions as an evaporator or a condenser. The indoor heat exchanger 8 can be constructed with, for example, a cross fin-type fin-and-tube heat exchanger including heat transfer tubes and a large number of fins. In this case, the indoor heat exchanger 8 is described as an exchanger configured to exchange heat between the refrigerant passing through the heat transfer tubes and, for example, air in an indoor space to be supplied with heat (a space to be air-conditioned). However, the indoor heat exchanger 8 may be a heat exchanger configured to exchange heat between the refrigerant and a heat medium other than air (e.g., water or brine). Further, the indoor heat exchanger 8 may not be a fin-and-tube heat exchanger depending on the heat medium with which the heat is exchanged. For example, a microchannel heat exchanger, a shell and tube heat exchanger, a heat pipe heat exchanger, a double pipe heat exchanger, a plate heat exchanger, or other heat exchangers may be employed. Further, although a case where the second heat exchanger is the indoor heat exchanger 8 installed indoors is described as an example, a location of installation of the second heat exchanger is not limited to indoors. The second heat exchanger only needs to be a heat exchanger provided on a use side, e.g., the space to be air-conditioned.

The indoor air-sending device 8a is configured to supply the air to the indoor heat exchanger 8. The indoor air-sending device 8a changes a flow rate of the air supplied to the indoor heat exchanger 8. For example, as the indoor air-sending device 8a, a centrifugal fan or a multiblade fan to be driven by a motor, e.g., a DC fan motor, can be employed. In this case, when the indoor heat exchanger 8 exchanges the heat between the refrigerant and the heat medium other than the air, the heat medium may be supplied to the indoor heat exchanger 8 by a delivering device, e.g., a pump in place of the indoor air-sending device 8a.

Further, the refrigeration cycle apparatus 100A includes the controller 20 configured to generally control an operation of the refrigeration cycle apparatus 100A, mainly for devices included in the outdoor unit 1. The controller 20 is configured to control various actuators (parts to be driven, including the compressor 3, the four-way valve 4, the outdoor air-sending device 5a, the electronic expansion valve 6, and the indoor air-sending device 8a) included in the refrigeration cycle apparatus 100A, based on values (detection values) associated with detection by various detectors (sensors) (not shown) mounted to the refrigerant circuit or other components. The controller 20 can be constructed with, for example, a microcomputer, a digital signal processor, or other components. For example, the controller 20 includes a control arithmetic processing unit, for example, a central processing unit (CPU). Further, the controller 20 includes a storage device (not shown) and has data with a processing procedure associated with control or other operations in the form of a program. The control arithmetic processing unit executes processing based on the data of the program so as to implement control of devices or other components. Although the controller 20 is installed inside the outdoor unit 1, the controller 20 may be installed at any location as long as the control of the devices or other components can be performed.

In FIG. 1, in the cooling energy supply mode (e.g., during the cooling operation) in which the cooling energy is supplied from the indoor heat exchanger 8, the passages inside the four-way valve 4 are as indicated by the solid lines. In the heating energy supply mode (e.g., during the heating operation) in which the heating energy is supplied from the indoor heat exchanger 8, the passages inside the four-way valve 4 are as indicated by the dotted lines. Therefore, in the cooling energy supply mode, the refrigerant circulates through the compressor 3, the four-way valve 4, the outdoor heat exchanger 5, the electronic expansion valve 6, the indoor heat exchanger 8, and the compressor 3 in the stated order. Further, in the heating energy supply mode, the refrigerant circulates through the compressor 3, the four-way valve 4, the indoor heat exchanger 8, the electronic expansion valve 6, the outdoor heat exchanger 5, and the compressor 3 in the stated order. Therefore, in the cooling energy supply mode, the outdoor heat exchanger 5 functions as the condenser, whereas the indoor heat exchanger 8 functions as the evaporator. Further, in the heating energy supply mode, the outdoor heat exchanger 5 functions as the evaporator, whereas the indoor heat exchanger 8 functions as the condenser.

Next, a refrigerant employed in the refrigeration cycle apparatus 100A of this embodiment is described. As the refrigerant employed in the refrigeration cycle apparatus 100A, 1,1,2-trifluoroethylene (HFO-1123) having a low GWP and a high operating pressure among HFO-based refrigerants and R32 ($CH_2F_2$; difluoromethane) having a low GWP and a high operating pressure among HFC-based refrigerants are employed.

Effects of Embodiment 1

When HFO-1123 is employed as the refrigerant for the refrigeration cycle apparatus, HFO-1123 is liable to cause a self-decomposition reaction under high-temperature and high-pressure conditions. Therefore, in this embodiment, by circulating a refrigerant mixture obtained by mixing HFO-1123 and R32, stability of HFO-1123 is enhanced to enable suppression of the self-decomposition.

Figure 2:
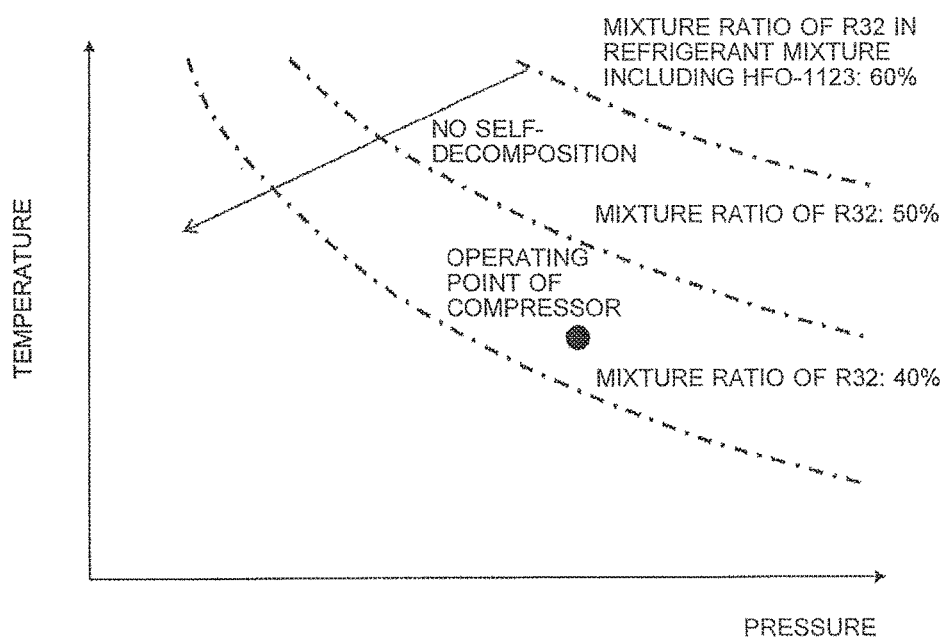
FIG. 2 is a graph for showing a relationship between a refrigerant mixture of R32 and HFO-1123, and temperature and pressure according to Embodiment 1 of the present invention.

FIG. 2 is a graph for showing a relationship between the refrigerant mixture of R32 and HFO-1123, and temperature and pressure according to Embodiment 1 of the present invention. In FIG. 2, it is understood that the temperature and the pressure at which HFO-1123 causes the self-decomposition in the refrigerant circuit differ depending on a mixture ratio between R32 and HFO-1123. From this fact, by mixing R32 and HFO-1123 so that HFO-1123 does not cause the self-decomposition at the temperature and the pressure that are equal to or higher than those at an operating point of the compressor of the refrigeration cycle apparatus 100A, the refrigeration cycle apparatus 100A can operate without impairing performance of the refrigeration cycle apparatus 100A. In this case, as shown in FIG. 2, a mixture ratio between R32 and HFO-1123 is expressed in mass percent (mass %, the same applies hereinafter), and is preferably set so that R32 is greater than HFO-1123. In particular, it is preferred that the ratio between R32 and HFO-1123 be 60:40.

Figure 3:
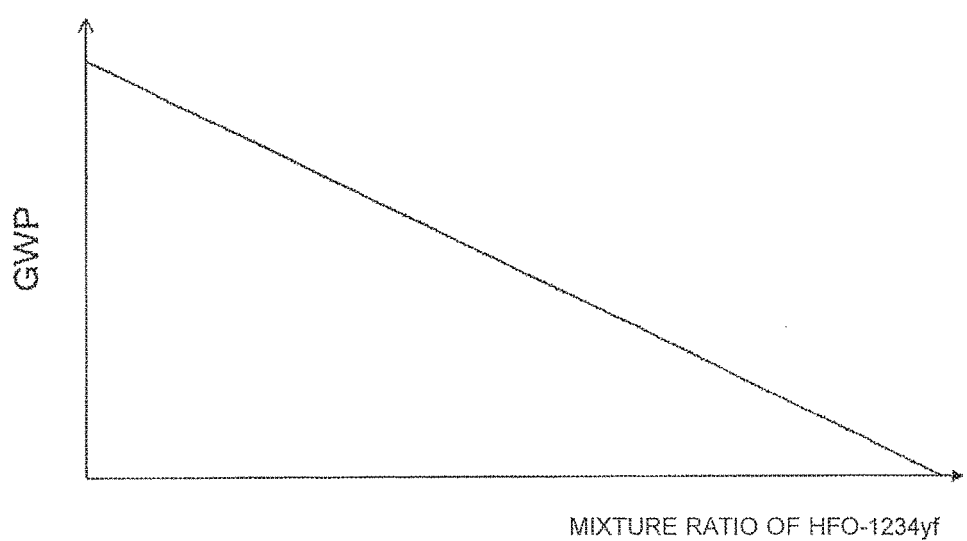
FIG. 3 is a graph for showing a relationship between a mixture ratio of HFO-1234yf in the refrigerant mixture and a GWP according to Embodiment 1 of the present invention.

FIG. 3 is a graph for showing a relationship between the mixture ratio of HFO-1234yf in the refrigerant mixture and the GWP according to Embodiment 1 of the present invention. As shown in FIG. 3, by adding HFO-1234yf, which is the low-GWP refrigerant to R32 and HFO-1123, the GWP can be reduced without the self-decomposition of HFO-1123.

Figure 4:
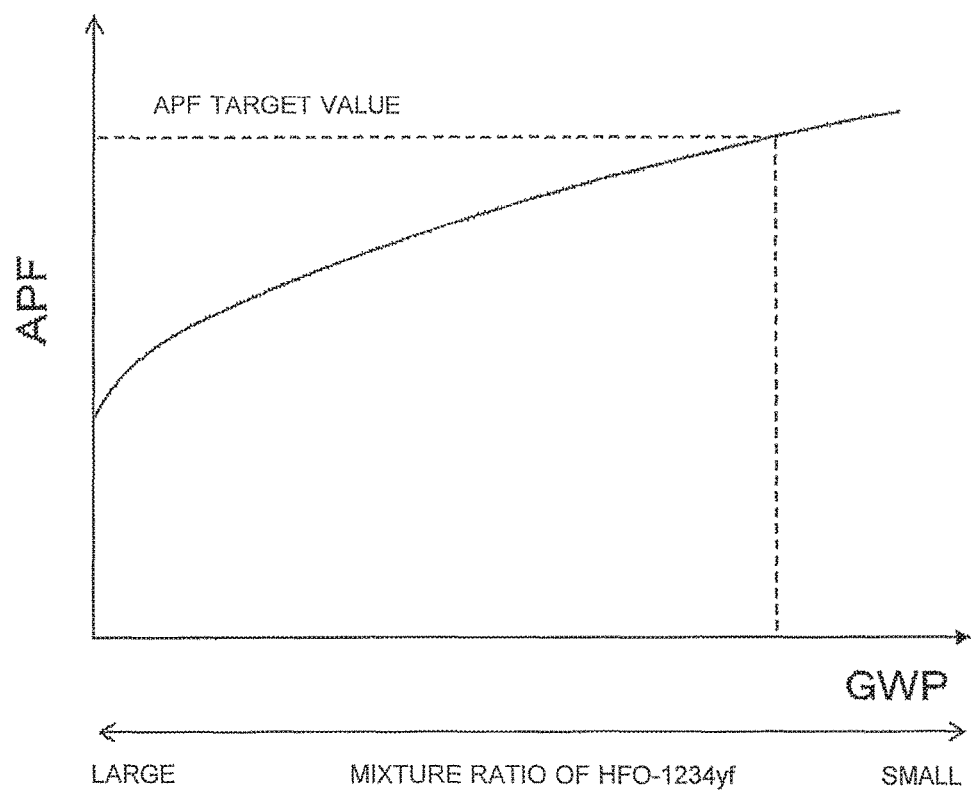
FIG. 4 is a graph for showing a relationship between the mixture ratio of HFO-1234yf in the refrigerant mixture and performance of a refrigeration cycle in a refrigeration cycle apparatus 100A according to Embodiment 1 of the present invention.

FIG. 4 is a graph for showing a relationship between the mixture ratio of HFO-1234yf in the refrigerant mixture and the performance of the refrigeration cycle in the refrigeration cycle apparatus 100A according to Embodiment 1 of the present invention. For example, in FIG. 4, HFO-1234yf is a low-pressure refrigerant. Therefore, when the mixture ratio of HFO-1234yf is increased, the performance of the refrigeration cycle is lowered (particularly remarkable in rated cooling). Therefore, in order to achieve the low GWP and the performance of the refrigeration cycle, it is preferred that the mixture ratio among R32, HFO-1234yf, and HFO1234yf be set to R32>HFO-1123>HFO-1234yf in mass %. In particular, it is preferred that a ratio of HFO-1234yf be set to 26% or greater in the entire refrigerant mixture while maintaining the ratio between R32 and HFO-1123 to 60:40.

Embodiment 2

Figure 5:
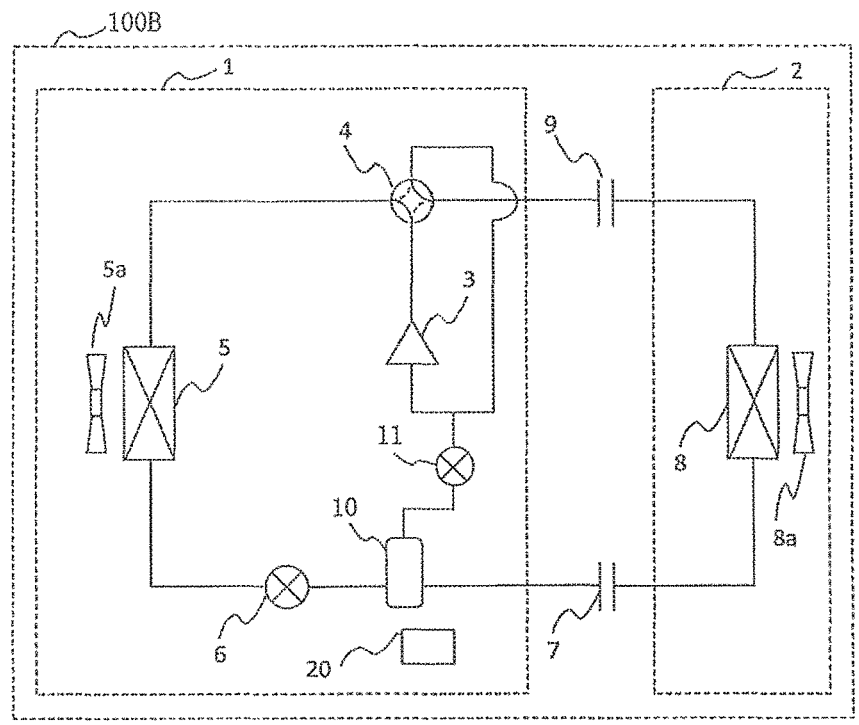
FIG. 5 is a schematic configuration diagram for illustrating an example of a refrigerant circuit configuration of a refrigeration cycle apparatus according to Embodiment 2 of the present invention.

FIG. 5 is a schematic configuration diagram for illustrating an example of a refrigerant circuit configuration of a refrigeration cycle apparatus (hereinafter referred to as "refrigeration cycle apparatus 100B") according to Embodiment 2 of the present invention. In the refrigeration cycle apparatus 100B of Embodiment 2, devices configured to perform the same operations as those in the refrigeration cycle apparatus 100A described in Embodiment 1 are denoted by the same reference symbols.

A basic configuration of the refrigeration cycle apparatus 100B is the same as that of the refrigeration cycle apparatus 100A according to Embodiment 1. The refrigeration cycle apparatus 100B of Embodiment 2 includes a gas-liquid separator 10 on a downstream side of the electronic expansion valve 6 with respect to a flow of the refrigerant in the cooing energy supply mode in which the outdoor heat exchanger 5 functions as the condenser. A pipe through which the refrigerant flows to the indoor heat exchanger 8 and a pipe (bypass pipe) through which the refrigerant flows to the compressor 3 while bypassing the indoor heat exchanger 8 are connected to the gas-liquid separator 10. A liquid-phase refrigerant (liquid refrigerant) mainly flows through the pipe connected to the indoor heat exchanger 8. Further, a gas-phase refrigerant (gas refrigerant) mainly flows through the bypass pipe. The bypass pipe includes a bypass electronic expansion valve 11 that is a bypass flow control device. A refrigerant employed in the refrigeration cycle apparatus 100B is a refrigerant mixture similar to the refrigerant employed in the refrigeration cycle apparatus 100A according to Embodiment 1.

The gas-liquid separator 10 illustrated in FIG. 5 is a device configured to separate the gas refrigerant and the liquid refrigerant from each other. The gas-liquid separator 10 is particularly effective during the cooling operation. The liquid refrigerant flows to the indoor heat exchanger 8, whereas the gas refrigerant bypasses the indoor heat exchanger 8 to flow to the compressor 3. Through reduction of an amount of gas refrigerant flowing into the indoor heat exchanger 8, a refrigerant pressure loss in the indoor heat exchanger 8 can be decreased. Therefore, the performance of the refrigeration cycle apparatus 100B can be improved.

The bypass electronic expansion valve 11 controls the amount of gas refrigerant that bypasses the indoor heat exchanger 8. The bypass electronic expansion valve 11 is a device configured to control its expansion opening degree based on an instruction from the controller 20 to control the flow rate of the refrigerant, reduce the pressure of the refrigerant, and perform other operations. In this case, the bypass electronic expansion valve 11 having the structure controlling the expansion opening degree is described as an example of a bypass flow control device. However, the bypass flow control device is not limited thereto. For example, a mechanical expansion valve using a diaphragm for a pressure-receiving portion, a capillary tube, or other devices may be employed as the bypass flow control device.

Effects of Embodiment 2

Figure 6:
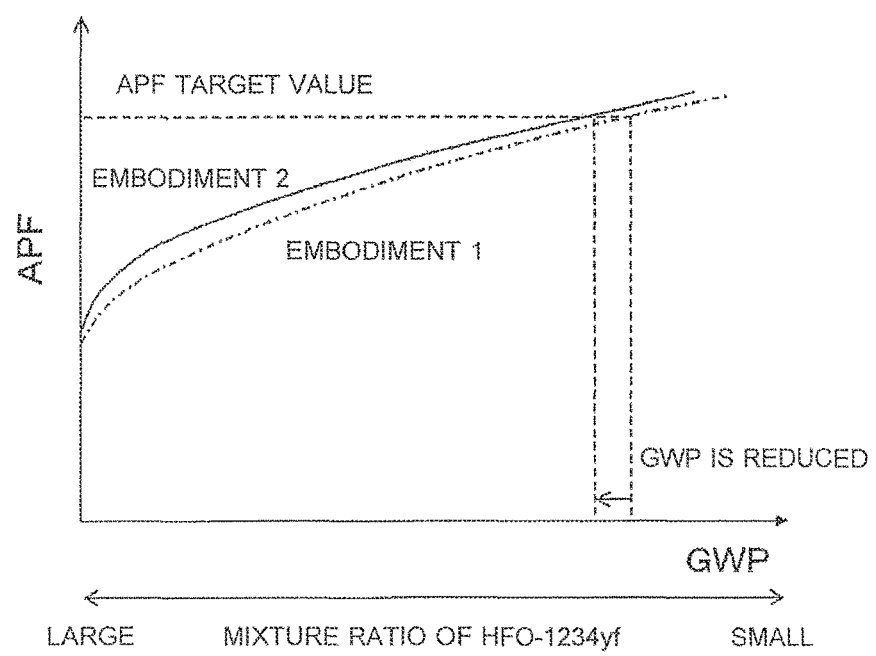
FIG. 6 is a graph for showing a relationship between a mixture ratio of HFO-1234yf in a refrigerant mixture and performance of a refrigeration cycle in a refrigeration cycle apparatus 100B according to Embodiment 2 of the present invention.

FIG. 6 is a graph for showing a relationship between a mixture ratio of HFO-1234yf in the refrigerant mixture and the performance of the refrigeration cycle in the refrigeration cycle apparatus 100B according to Embodiment 2 of the present invention. As shown in FIG. 6, according to the refrigeration cycle apparatus 100B of Embodiment 2 of the present invention, through actuation of the gas-liquid separator 10, the mixture ratio of HFO-1234yf, at which the HFO-1123 does not cause the self-decomposition, can be increased while the performance of the refrigeration cycle is maintained. Therefore, the GWP of the refrigerant can be reduced.

Embodiment 3

Figure 7:
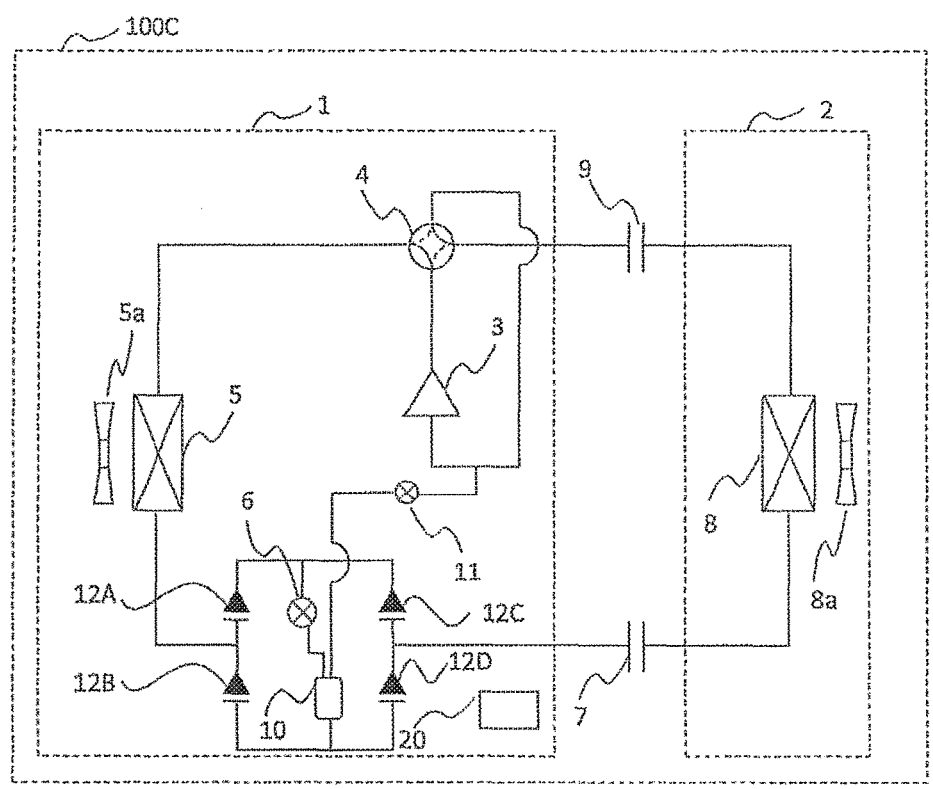
FIG. 7 is a schematic configuration diagram for illustrating an example of a refrigerant circuit configuration of a refrigeration cycle apparatus according to Embodiment 3 of the present invention.

FIG. 7 is a schematic configuration diagram for illustrating an example of a refrigerant circuit configuration of a refrigeration cycle apparatus (hereinafter referred to as "refrigeration cycle apparatus 100C") according to Embodiment 3 of the present invention. In the refrigeration cycle apparatus 100C of Embodiment 3, devices configured to perform operations similar to those in the refrigeration cycle apparatus 100A described in Embodiment 1 or the refrigeration cycle apparatus 100B described in Embodiment 2 are denoted by the same reference symbols.

A basic configuration of the refrigeration cycle apparatus 100C is the same as that of the refrigeration cycle apparatus 100A of Embodiment 1 or the refrigeration cycle apparatus 100B of Embodiment 2. The refrigeration cycle apparatus 100B of Embodiment 2 includes the gas-liquid separator 10 on the refrigerant downstream side of the electronic expansion valve 6 in the cooling energy supply mode. In this embodiment, a rectifier circuit is provided so that the gas-liquid separator 10 is positioned on the refrigerant downstream side of the electronic expansion valve 6 even in the heating energy supply mode in which the indoor heat exchanger 8 functions as the condenser. In this case, a refrigerant employed in the refrigeration cycle apparatus 100C is a refrigerant mixture similar to the refrigerants employed in the refrigeration cycle apparatus 100A according to Embodiment 1 and the refrigeration cycle apparatus 100B according to Embodiment 2.

Figure 8:
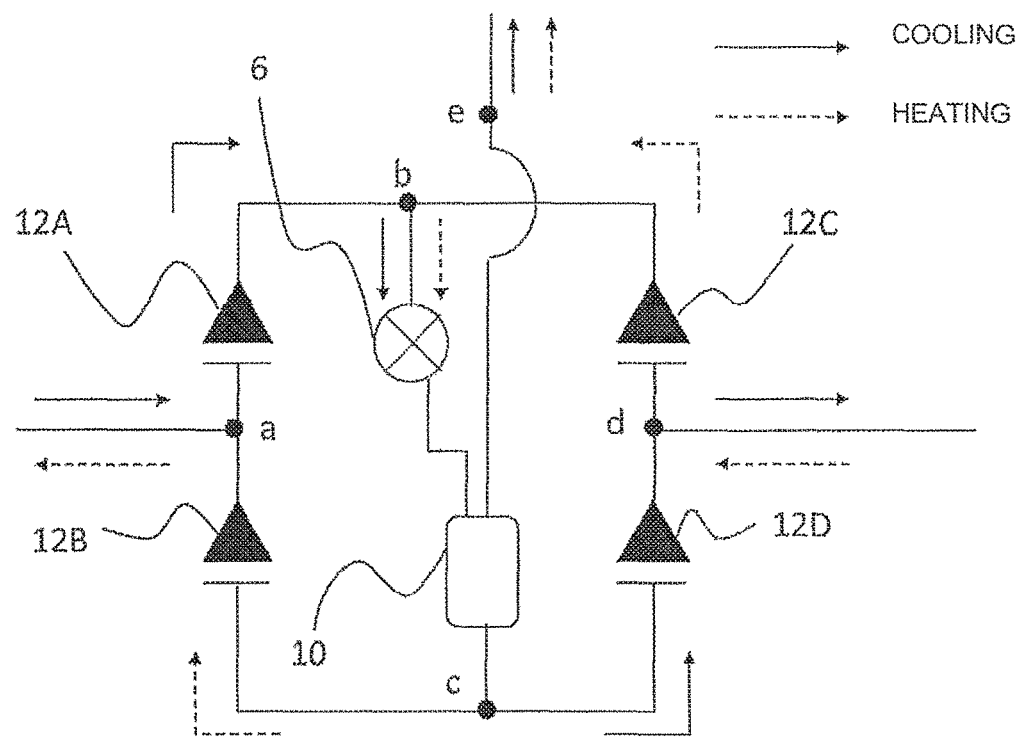
FIG. 8 is a configuration diagram for illustrating in an enlarged manner a rectifier circuit portion in a refrigeration cycle apparatus 100C according to Embodiment 3 of the present invention.

FIG. 8 is a configuration diagram for illustrating in an enlarged manner a rectifier circuit portion in the refrigeration cycle apparatus 100C according to Embodiment 3 of the present invention. As illustrated in FIG. 8, a check valve 12A to a check valve 12D are valves configured to set a flow of the refrigerant in one direction. In this embodiment, a rectifier is formed by the check valve 12A to the check valve 12D.

Next, the flow of the refrigerant in the rectifier circuit is described. In the cooling energy supply mode, the refrigerant flowing out of the outdoor heat exchanger 5 flows into the rectifier circuit from a point a, passes through the check valve 12A, and flows into the electronic expansion valve 6 from a point b. The refrigerant passing through the electronic expansion valve 6 flows into the gas-liquid separator 10. The liquid refrigerant flowing out of the gas-liquid separator 10 passes through a point c and the check valve 12D. The refrigerant flowing out of the check valve 12D passes through a point d to flow into the indoor heat exchanger 8. Further, the gas refrigerant flowing out of the gas-liquid separator 10 passes through a point e to flow into the bypass pipe.

In the heating energy supply mode, the refrigerant flowing out of the indoor heat exchanger 8 flows into the rectifier circuit from the point d, passes through the check valve 12C, and flows into the electronic expansion valve 6 from the point b. The refrigerant passing through the electronic expansion valve 6 flows into the gas-liquid separator 10. The liquid refrigerant flowing out of the gas-liquid separator 10 passes through the point c and the check valve 12B. The refrigerant flowing out of the check valve 12B passes through the point a to flow into the outdoor heat exchanger 5. Further, the gas refrigerant flowing out of the gas-liquid separator 10 passes through the point e to flow into the bypass pipe.

As described above, the refrigeration cycle apparatus 100C of this embodiment is configured to switch a circulation passage, thereby allowing the gas-liquid separator 10 to function in both operating states, that is, the cooling energy supply mode in which the indoor heat exchanger 8 functions as the evaporator so as to cool a load and the heating energy supply mode in which the indoor heat exchanger 8 functions as the condenser so as to heat the load. Therefore, the performance of the refrigeration cycle apparatus 100C can be improved.

Effects of Embodiment 3

Figure 9:
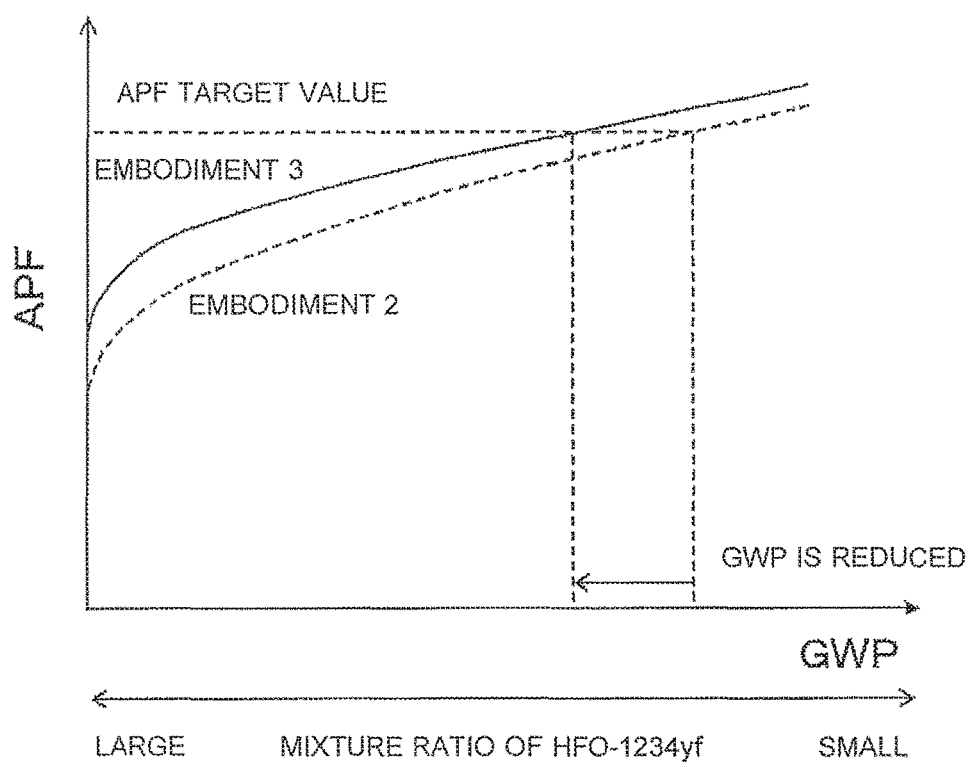
FIG. 9 is a graph for showing a relationship between a mixture ratio of HFO-1234yf in a refrigerant mixture and performance of a refrigeration cycle in the refrigeration cycle apparatus 100C according to Embodiment 3 of the present invention.

FIG. 9 is a graph for showing a relationship between a mixture ratio of HFO-1234yf in the refrigerant mixture and the performance of the refrigeration cycle in the refrigeration cycle apparatus 100C according to Embodiment 3 of the present invention. As shown in FIG. 9, according to the refrigeration cycle apparatus 100C of Embodiment 3 of the present invention, the gas-liquid separator 10 can be actuated regardless of the mode. As a result, the mixture ratio of HFO-1234yf, at which HFO-1123 does not cause the self-decomposition, can be increased while the performance of the refrigeration cycle is maintained. Thus, the GWP of the refrigerant can be reduced.

Embodiment 4

Figure 10:
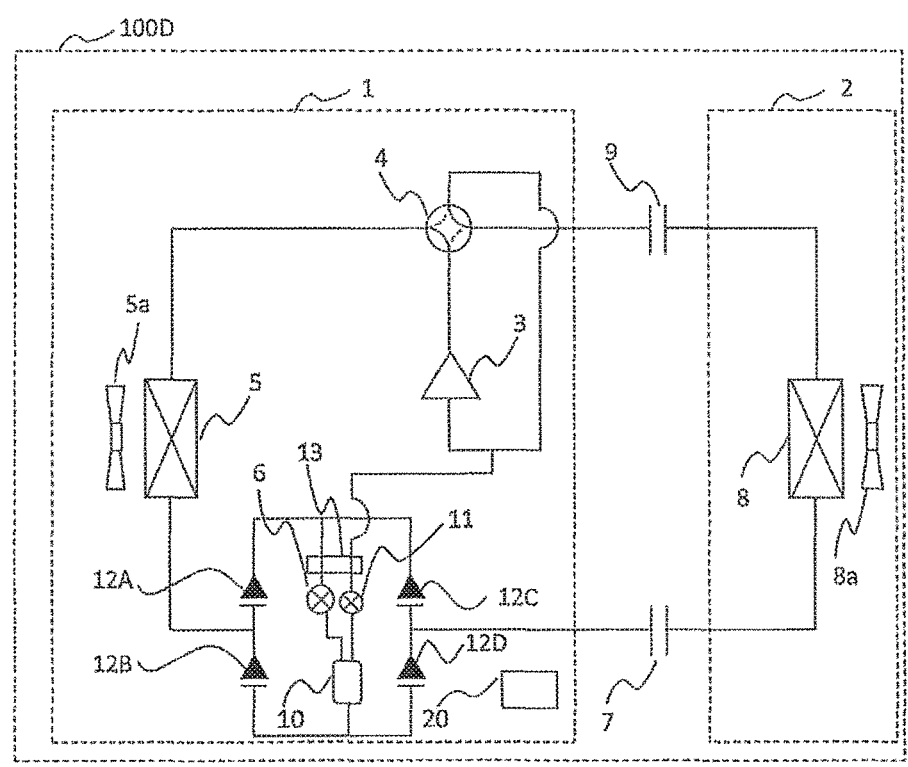
FIG. 10 is a schematic configuration diagram for illustrating an example of a refrigerant circuit configuration of a refrigeration cycle apparatus according to Embodiment 4 of the present invention.

FIG. 10 is a schematic configuration diagram for illustrating an example of a refrigerant circuit configuration of a refrigeration cycle apparatus (hereinafter referred to as "refrigeration cycle apparatus 100D") according to Embodiment 4 of the present invention. In the refrigeration cycle apparatus 100D of Embodiment 4, devices configured to perform the same operations as those in the refrigeration cycle apparatus 100A described in Embodiment 1, the refrigeration cycle apparatus 100B described in Embodiment 2, or the refrigeration cycle apparatus 100C described in Embodiment 3 are denoted by the same reference symbols.

A basic configuration of the refrigeration cycle apparatus 100D is the same as that of the refrigeration cycle apparatus 100A according to Embodiment 1, the refrigeration cycle apparatus 100B according to Embodiment 2, or the refrigeration cycle apparatus 100C according to Embodiment 3. The refrigeration cycle apparatus 100D of Embodiment 4 includes an internal heat exchanger (inter-refrigerant heat exchanger) 13. A pipe and a bypass pipe through which the refrigerant flowing into the electronic expansion valve 6 passes are connected to the internal heat exchanger 13. In this case, a refrigerant employed in the refrigeration cycle apparatus 100D is a refrigerant mixture similar to the refrigerants employed in the refrigeration cycle apparatus 100A according to Embodiment 1, the refrigeration cycle apparatus 100B according to Embodiment 2, and the refrigeration cycle apparatus 100C according to Embodiment 3.

The internal heat exchanger 13 exchanges heat between a refrigerant before flowing into the electronic expansion valve 6 and a refrigerant flowing out of the gas-liquid separator 10 to pass through the bypass pipe. In this case, the refrigerant before flowing into the electronic expansion valve 6 has a higher temperature than the refrigerant passing through the bypass pipe. Through the heat exchange in the internal heat exchanger 13, the refrigerant before flowing into the electronic expansion valve 6 can be subcooled. Through the subcooling of the refrigerant, the performance of the refrigeration cycle apparatus 100D can be improved.

Further, through the heat exchange in the internal heat exchanger 13, the refrigerant passing through the bypass pipe can be heated to ensure a degree of superheat. The degree of superheat of the refrigerant is ensured, and hence a risk of flow of the liquid refrigerant into the compressor 3 can be reduced. Therefore, reliability of the refrigeration cycle apparatus 100D can be enhanced. Further, liquid compression, which occurs due to the flow of the liquid refrigerant into the compressor 3, is prevented. As a result, the performance of the refrigeration cycle apparatus 100D can be maintained.

Effects of Embodiment 4

Figure 11:
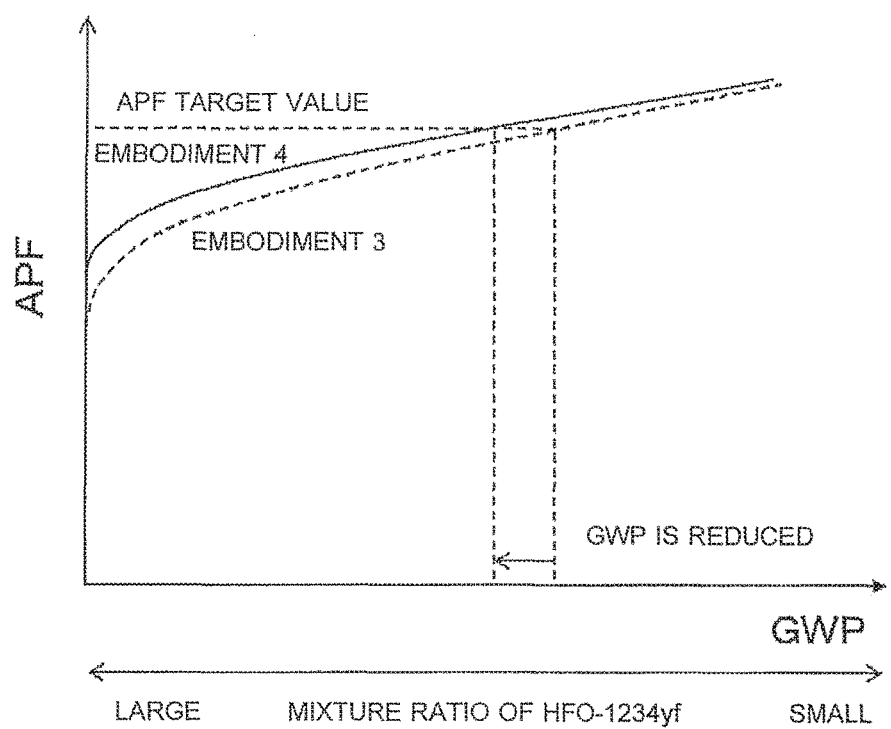
FIG. 11 is a graph for showing a relationship between a mixture ratio of HFO-1234yf in a refrigerant mixture and performance of a refrigeration cycle in a refrigeration cycle apparatus 100D according to Embodiment 4 of the present invention.

FIG. 11 is a graph for showing a relationship between a mixture ratio of HFO-1234yf in the refrigerant mixture and the performance of the refrigeration cycle in the refrigeration cycle apparatus 100D according to Embodiment 4 of the present invention. As shown in FIG. 11, the refrigeration cycle apparatus 100D according to Embodiment 4 of the present invention includes the internal heat exchanger 13 so as to subcool the refrigerant before flowing into the electronic expansion valve 6. Therefore, the performance of the refrigeration cycle apparatus 100D can be improved. Further, the degree of superheat of the refrigerant passing through the bypass pipe is ensured. Therefore, the reliability of the refrigeration cycle apparatus 100D can be enhanced. Still further, the liquid compression can be prevented so as to improve the performance of the refrigeration cycle apparatus 100D. As a consequence, the mixture ratio of HFO-1234yf, at which HFO-1123 does not cause the self-decomposition, can be increased while the performance of the refrigeration cycle is maintained. Thus, the GWP of the refrigerant can be reduced.

Embodiment 5

Figure 12:
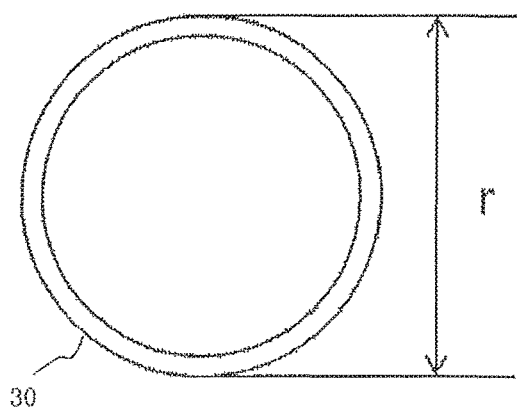
FIG. 12 is a view for illustrating a heat transfer tube of a heat exchanger according to Embodiment 5 of the present invention.

FIG. 12 is a view for illustrating a heat transfer tube 30 of a heat exchanger according to Embodiment 5 of the present invention. In the refrigeration cycle apparatus 100A to the refrigeration cycle apparatus 100D of Embodiment 1 to Embodiment 4 described above, the heat transfer tube 30 employed in at least one of the outdoor heat exchanger 5 and the indoor heat exchanger 8 is a circular heat transfer tube, as illustrated in FIG. 12. An outer diameter r of the heat transfer tube 30 is set to 7.0 mm or smaller.

For example, when the refrigerant mixture of R32 and HFO-1123 or the refrigerant mixture of R32, HFO-1123, and HFO-1234yf is employed in the refrigerant circuit, each of the refrigerants is slightly combustible. Therefore, in consideration of a combustibility risk, it is preferred that a diameter of the refrigerant pipes be small.

Therefore, when the refrigerant mixture of R32 and HFO-1123 or the refrigerant mixture of R32, HFO-1123, and HFO-1234yf (note that, the mixture ratio is set so that HFO-1123 is equal to or greater than HFO-1234yf) is employed, influence of the pressure loss of the refrigerant pipes is small even when the outer diameter r of the heat transfer tube 30 in the outdoor heat exchanger 5 is 7.0 mm or smaller. Further, the amount of refrigerant can be reduced. As a result, a high performance refrigeration cycle apparatus can be obtained.

In this case, although not particularly limited, an inner surface groove can be formed on an inner surface side of the heat transfer tube 30 employed in at least one of the outdoor heat exchanger 5 and the indoor heat exchanger 8. Through the formation of the inner surface groove, a surface area on an inner side of the heat transfer tube 30 can be increased, while the flow of the refrigerant can be made turbulent. Thus, heat transfer performance of the heat transfer tube 30 can be improved.

Embodiment 6

Figure 13:
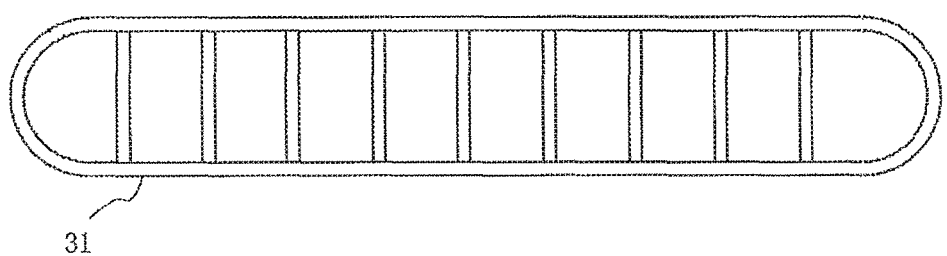
FIG. 13 is a view for illustrating a heat transfer tube of a heat exchanger according to Embodiment 6 of the present invention.

FIG. 13 is a view for illustrating a heat transfer tube 31 of a heat exchanger according to Embodiment 6 of the present invention. In the refrigeration cycle apparatus 100A to the refrigeration cycle apparatus 100D of Embodiment 1 to Embodiment 4 described above, the heat transfer tube 31 employed in at least one of the outdoor heat exchanger 5 and the indoor heat exchanger 8 is a tube having a flat shape (flat tube), as illustrated in FIG. 13. When the heat transfer tube 31 is formed into a flat shape, a tube volume can be reduced. Thus, the amount of refrigerant can be reduced. As a result, a high performance refrigeration cycle apparatus can be obtained.

INDUSTRIAL APPLICABILITY

The refrigeration cycle apparatus described in each of the embodiments is applicable to an apparatus forming a refrigerant circuit using a refrigeration cycle, for example, an air-conditioning apparatus (e.g., a refrigeration apparatus, a room air conditioner, a package air conditioner, or a multi-air conditioner for a building), or a heat pump water heater.

The invention claimed is:

1. A refrigeration cycle apparatus comprising
a refrigerant circuit formed by connecting, by pipes,
   a compressor configured to compress refrigerant sucked into the compressor and discharge the refrigerant,
   a condenser configured to allow the refrigerant to reject heat and condense the refrigerant,
   a flow control device configured to reduce a pressure of the condensed refrigerant, and
   an evaporator configured to allow the refrigerant to remove heat and evaporate the refrigerant;
   a gas-liquid separator installed between the flow control device and the evaporator, and configured to separate gaseous refrigerant and liquid refrigerant from each other;
   a bypass pipe configured to connect the gas-liquid separator and a suction side of the compressor to each other;
   a bypass flow control device configured to control an amount of refrigerant passing through the bypass pipe;
   a refrigerant circuit switching device configured to switch a circulation passage of the refrigerant; and
   a rectifier configured to control the circulation passage of the refrigerant so that the refrigerant passes through the flow control device, the gas-liquid separator, and the evaporator in a stated order,
      the refrigerant being a refrigerant mixture comprising R32 and HFO-1123, and in the refrigerant mixture, R32 is greater than HFO-1123 in mass %.

2. The refrigeration cycle apparatus of claim 1, wherein, in the refrigerant mixture, a ratio between R32 and HFO-1123 is 60:40 in mass %.

3. The refrigeration cycle apparatus of claim 2, wherein the refrigerant mixture further comprises HFO-1234yf.

4. The refrigeration cycle apparatus of claim 3, wherein, in the refrigerant mixture, R32 is greater than HFO-1123 and HFO-1234yf in mass %, and HFO-1123 is greater than HFO-1234yf in mass %.

5. The refrigeration cycle apparatus of claim 3, wherein a ratio between R32 and HFO-1123 is 60:40 in mass %, and HFO-1234yf in mass % is 26% or greater in the entire refrigerant mixture.

6. The refrigeration cycle apparatus of claim 2, further comprising an internal heat exchanger configured to exchange heat between the refrigerant flowing from the condenser toward the flow control device and the refrigerant passing through the bypass pipe.

7. The refrigeration cycle apparatus of claim 2, wherein at least one of the condenser and the evaporator comprises a heat exchanger including a heat transfer tube having a circular tube shape, and a diameter of the heat transfer tube is equal to or smaller than 7.0 mm.

8. The refrigeration cycle apparatus of claim 2, wherein at least one of the condenser and the evaporator comprises a heat exchanger including a heat transfer tube having a flat shape.

9. The refrigeration cycle apparatus of claim 1, wherein the refrigerant mixture further comprises HFO-1234yf.

10. The refrigeration cycle apparatus of claim 9, wherein, in the refrigerant mixture, R32 is greater than HFO-1123 and HFO-1234yf in mass %, and HFO-1123 is greater than HFO-1234yf in mass %.

11. The refrigeration cycle apparatus of claim 9, wherein a ratio between R32 and HFO-1123 is 60:40 in mass %, and HFO-1234yf in mass % is 26% or greater in the entire refrigerant mixture.

12. The refrigeration cycle apparatus of claim 9, further comprising an internal heat exchanger configured to exchange heat between the refrigerant flowing from the condenser toward the flow control device and the refrigerant passing through the bypass pipe.

13. The refrigeration cycle apparatus of claim 9, wherein at least one of the condenser and the evaporator comprises a heat exchanger including a heat transfer tube having a circular tube shape, and a diameter of the heat transfer tube is equal to or smaller than 7.0 mm.

14. The refrigeration cycle apparatus of claim 9, wherein at least one of the condenser and the evaporator comprises a heat exchanger including a heat transfer tube having a flat shape.

15. The refrigeration cycle apparatus of claim 1, further comprising an internal heat exchanger configured to exchange heat between the refrigerant flowing from the condenser toward the flow control device and the refrigerant passing through the bypass pipe.

16. The refrigeration cycle apparatus of claim 1, wherein at least one of the condenser and the evaporator comprises a heat exchanger including a heat transfer tube having a circular tube shape, and a diameter of the heat transfer tube is equal to or smaller than 7.0 mm.

17. The refrigeration cycle apparatus of claim 1, wherein at least one of the condenser and the evaporator comprises a heat exchanger including a heat transfer tube having a flat shape.

\* \* \* \* \*